(12) United States Patent
Kim et al.

(10) Patent No.: US 8,064,468 B2
(45) Date of Patent: Nov. 22, 2011

(54) METHOD FOR PROVIDING FUNCTION OF REGISTERING IN SESSION INITIATION PROTOCOL AND SIP LOAD BALANCER OF ENABLING THE METHOD

(75) Inventors: Hoi Jun Kim, Daejeon (KR); Young Cheol Cho, Seoul (KR); Kwang Hyun Kim, Seoul (KR); Sung Han Bae, Seongnam-si (KR); Kyeong Heon Lee, Seoul (KR); Jun Hee Lee, Seoul (KR)

(73) Assignee: Piolink, Inc., Seoul (KR)

( * ) Notice: Subject to any disclaimer, the term of this patent is extended or adjusted under 35 U.S.C. 154(b) by 1120 days.

(21) Appl. No.: 11/815,463

(22) PCT Filed: Feb. 15, 2005

(86) PCT No.: PCT/KR2005/000413
§ 371 (c)(1),
(2), (4) Date: Aug. 28, 2007

(87) PCT Pub. No.: WO2006/083052
PCT Pub. Date: Aug. 10, 2006

(65) Prior Publication Data
US 2008/0144609 A1    Jun. 19, 2008

(30) Foreign Application Priority Data
Feb. 4, 2005    (KR) .................. 10-2005-0010360

(51) Int. Cl.
*H04L 12/28* (2006.01)
*H04L 9/32* (2006.01)

(52) U.S. Cl. ....................................... 370/401; 713/170
(58) Field of Classification Search ................... None
See application file for complete search history.

(56) References Cited

U.S. PATENT DOCUMENTS

| | | | |
|---|---|---|---|
| 7,343,490 B2 * | 3/2008 | Le et al. ....................... | 713/170 |
| 7,489,634 B2 * | 2/2009 | Sanchez Cembellin et al. ............................. | 370/231 |
| 7,599,347 B2 * | 10/2009 | Wang ............................. | 370/349 |
| 7,643,442 B1 * | 1/2010 | Calhoun ........................ | 370/328 |
| 8,001,380 B2 * | 8/2011 | Chakarapani et al. ........ | 713/168 |
| 2003/0105962 A1 * | 6/2003 | Le et al. ........................ | 713/170 |
| 2004/0088424 A1 * | 5/2004 | Park et al. ..................... | 709/229 |
| 2004/0139230 A1 * | 7/2004 | Kim ............................... | 709/245 |
| 2004/0205192 A1 * | 10/2004 | Olson et al. ................... | 709/227 |
| 2006/0149811 A1 * | 7/2006 | Bennett et al. ................ | 709/203 |
| 2006/0155814 A1 * | 7/2006 | Bennett et al. ................ | 709/207 |
| 2007/0242628 A1 * | 10/2007 | Dutta et al. ................... | 370/310 |

FOREIGN PATENT DOCUMENTS

| | | |
|---|---|---|
| JP | 2004-120411 | 4/2004 |
| JP | 2004-192067 | 7/2004 |
| JP | 2004-328104 | 11/2004 |

* cited by examiner

*Primary Examiner* — Gregory Sefcheck
(74) *Attorney, Agent, or Firm* — Hammer & Associates, P.C.

(57) ABSTRACT

The present invention relates to a method of performing register functions in Session Initiation Protocol (SIP) load balancer and an SIP load balancer performing the method, and more particularly, to a method and apparatus for registering information of a user agent in at least one real SIP server by the SIP load balancer. According to the present invention, the number of messages transmitted and received by a user agent is decreased, thereby notably reducing the amount of information processed by the user agent.

10 Claims, 10 Drawing Sheets

--PRIOR ART--

--PRIOR ART--

--PRIOR ART--

METHOD FOR PROVIDING FUNCTION OF REGISTERING IN SESSION INITIATION PROTOCOL AND SIP LOAD BALANCER OF ENABLING THE METHOD

TECHNICAL FIELD

The present invention relates to a method of performing register functions in a Session Initiation Protocol (SIP) load balancer and an SIP load balancer using the method, and more particularly, to a method of registering information of a user agent in at least one real SIP server in an SIP load balancer and an apparatus using the method.

BACKGROUND ART

In network communication using a Session Initiation Protocol (SIP), such that a user agent is connected to a predetermined real SIP server and perform communication, it is required that information of a user agent should be registered in a real SIP server. Also, in order to register a user agent, a register method is used in SIP.

In this case, such that a user agent registers user agent information in at least one real SIP server using a register method, register message must be directly transmitted and received between the user agent and at least one real SIP server in which the information is to be registered. Also, in case that an authentication with respect to the user agent is required for registering user agent information, a real SIP server can register information of the user agent by a predetermined authentication between the user agent and the real SIP server.

Hereinafter, a process in which user agent information is registered in a real SIP server according to a conventional art will now be described.

FIG. 1 is a diagram illustrating a general process of registering user agent information in a single real SIP server not requiring authentication. A reference numeral 101 indicates a user agent, and a reference numeral 102 indicates a real SIP server.

A register process between a user agent and a real SIP server in SIP according to RFC3261 in association with SIP of a conventional art is like following.

A user agent 101 transmits a first register message 103 to a real SIP server 102.

The first register message may be composed of information such as indicated by a reference numeral 103. Since the information included in the SIP message is well-known to those skilled in the art, detailed description now be omitted.

The real SIP server 102 receiving the first register message 103 transmits an acknowledgement message 104 to the user agent 101. The acknowledgement message 104 may be 200 OK message widely used in general SIP.

The user agent 101 receives the acknowledgement message 104, and the process of registering in the real SIP server 102 is finished.

FIG. 2 is a diagram illustrating a general process of registering user agent information in at least one real SIP sever not requiring authentication.

Referring to FIG. 2, in operation 201, a user agent transmits a first register message to a first real SIP server. The first register message has the same form as the message form illustrated in FIG. 1.

In operation 202, the first real SIP server receives the first register message, registers information of the user agent, and transmits an acknowledgement message to the user agent.

In operation 203, the user agent receives the acknowledgement message and transmits a second register message to a second real SIP sever in which the information of the user agent is registered next.

In operation 204, the second real SIP server receives the second register message, registers the information of user agent, and transmits an acknowledgement message to the user agent.

The process described above is repeated until the information of the user agent is registered in the entire real SIP server in which the user agent is going to be registered. Accordingly, the user agent has to record information of the at least one real SIP server in which the user agent is going to be registered. In case that network address information of the real SIP server is not known, network addresses of the entire real SIP server connected to the user agent is obtained via broadcasting. Also, the entire real SIP server, register messages, and acknowledgement messages should be transmitted and received.

FIG. 3 is a diagram illustrating a general process of registering user agent information in single real SIP server requiring authentication.

According to RFC-3261 with respect to SIP, HTTP authentication method is recommended for authenticating users in a register process between a user agent and real SIP servers. A process of registering user agent information in a real SIP server according to the HTTP authentication method is like following.

In operation 301, a user agent transmits a first register message to an SIP server. In this case, the first register message may include information as following as an example.

---

REGISTER sip:192.168.1.150 SIP/2.0
From: <sip:20001@192.168.1.150>;tag=7701a8c0-13c4-14-6dc6-76da
To: <sip:20001@192.168.1.150>
Call-ID: 7701a8c0-13c4-14-6d06-5aef@192.168.1.119
CSeq: 1 REGISTER
Via: SIP/2.0/UDP 192.168.1.119:5060;branch=z9hG4bK-14-6dc8-370b
Max-Forwards: 70
Supported: 100rel,replaces
Contact: <sip:20001@192.168.1.119>
Expires: 3600
Content-Length:0

---

In operation 302, the real SIP server receives the first register message and transmits a first response message required for authentication to the user agent. In this case, 401 Unauthorized message can be used as the first response message, and the first response message may include information as following as an example.

---

SIP/2.0 401 Unauthorized
Via: SIP/2.0/UDP 192.168.1.119:5060;branch=z9hG4bK-14-6dc8-370b
From: <sip:20001@192.168.1.150>;tag=7701a8c0-13c4-14-6dc6-76da
To: <sip:20001@192.168.1.150>;tag=atelo-5dd5-b05276c1
Call-ID: 7701a8c0-13c4-14-6d06-5aef@192.168.1.119
CSeq: 1 REGISTER
Content-Length: 0
WWW-Authenticate:  Digest  nonce="MDAxMDk5ODE4MzExOjExMzFiaF
lIV05oL0d1MjYxYUd2UnZUUHc9PQ==",realm="sip.ne.jp"

---

The first response message as described above includes a WWW-Authenticate header with respect to authentication, and the WWW-Authenticate header may include digest nonce value. The digest nonce value is information included for authenticating the user agent.

In operation 303, the user agent receives the first response message, generates a first register response message in response to the first response message, and transmits the first register response message to the real SIP server. The first register response message may include information as following as an example.

```
REGISTER sip:192.168.1.150 SIP/2.0
From: <sip:20001@192.168.1.150>;tag=7701a8c0-13c4-14-6dc6-76da
To: <sip:20001@192.168.1.150>
Call-ID: 7701a8c0-13c4-14-6d06-5aef@192.168.1.119
CSeq: 2 REGISTER
Via: SIP/2.0/UDP 192.168.1.119:5060;branch=z9hG4bK-15-6e46-4801
Max-Forwards: 70
Supported: 100rel,replaces
Contact: <sip:20001@192.168.1.119>
Expires: 3600
Authorization: Digest username="20001.test_directory", realm="sip.ne.jp",
   nonce="MDAxMDk5ODE4MzExOjExMzFiaFlIV05oL0d1MjYxYUd2UnZU
UHc9PQ==", uri="sip:192.168.1.150",
   response="b220ce33181c630194027c6bd0508756",
   algorithm=MD5
Content-Length:0
```

The first register response message as described above may include a response value in an authorization header which is an authentication response header, in response to the digest nonce value of the WWW-Authenticate header included in the first response message. For example, the response value may be a value hashed based on the nonce value.

Namely, the user agent analyzes the digest nonce value included in the first register message received from the real SIP server for authentication, generates a response value in response to the digest nonce value, and transmits the response value in the first register response message to the real SIP server.

In operation 304, the real SIP server receives the first register response message, ascertains information included in the first register response message, particularly, the response value, and transmits an acknowledgement message to the user agent when the information included in the first register response message is suitable for authentication response information. The acknowledgement message may include information as following as an example.

```
SIP/2.0 200 OK
Via: SIP/2.0/UDP 192.168.1.119:5060;branch=z9hG4bK-15-6e46-4801
From: <sip:20001@192.168.1.150>;tag=7701a8c0-13c4-14-6dc6-76da
To: <sip:20001@192.168.1.150>;tag=atelo-6ad4-b0545f09
Call-ID: 7701a8c0-13c4-14-6d06-5aef@192.168.1.119
CSeq: 2 REGISTER
Content-Length: 0
Date: 07 Nov 2004 09:05:12 GMT
Contact: sip:20001@192.168.1.119;expires=3600
```

In case that the information included in the received first register response message is not suitable for the authentication response information, the first response message is transmitted to the user agent in order to reattempt authentication.

FIG. 4 is a diagram illustrating a general process of registering user agent information in at least one real SIP server requiring authentication.

In conventional arts, such that a user agent registers user agent information in at least one real SIP server requiring authentication, processes with respect to the real SIP servers should be performed respectively.

In operation 401, the user agent transmits a first register message to a first real SIP server.

In operation 402, the first real SIP server receives the first register message and transmits a first response message to the user agent. As described referring to FIG. 3, the first response message may include a digest nonce value in a WWW-Authenticate header. For example, the first response message may include "1111" as the digest nonce value.

In operation 403, the user agent receives the first response message and transmits a first register response message to the first real SIP server in response to the first response message.

As described referring to FIG. 3, the first register response message can include a response value in an authorization header in response to the digest nonce value of the WWW-Authenticate header included in the first response message. In the example, the first register response message may include "aaaa" as a response value in response to the "1111" which is the digest nonce value of the first response message.

In operation 404, the first real SIP server receives the first register response message, ascertains the response value in the authorization header, and transmits an authentication acknowledgement message to the user agent in case that authentication response information is suitable.

In the example, the first real SIP server ascertains the "aaaa" included in the first register response message and transmits the authentication acknowledgement message to the user agent in case that authentication response information is suitable.

In case that the information included in the received first register response message is not the authentication response information, the first response message is transmitted to the user agent again in order to reattempt authentication.

The process as described above is identically applied to an information register process between the user agent and a second real SIP server.

Hence, according to the conventional art as described above, a user agent transmits a register message and receives an acknowledgement message, thereby registering information in a real SIP server.

However, since register messages are transmitted to real SIP servers respectively and acknowledgement messages with respect to the respective register messages should be ascertained in order to register information in at least one real SIP server, the number of transmitted messages and received messages becomes enormous, thereby increasing information to be processed by a user agent.

In addition, in reality in which the number of real SIP servers connected to a user agent by SIP is increased as nowadays, when the user agent registers severally user agent information in particular real SIP servers, loads on network is increased. In addition, the HTTP authentication is recommended for user authentication in SIP standard RFC3261. In order to register user agent information in real SIP servers performing authentication using the HTTP authentication, register messages should be transmitted to the entire respective real SIP servers, response messages should be received from the entire respective real SIP servers, register messages in response to the respective response messages should be generated and transmitted, and acknowledgement messages in response to the register response messages should be received.

Accordingly, in order to register user agent information in at least one real SIP server performing authentication, the number of transmitted messages and received messages becomes enormous to increase the amount of information to be processed by a user agent, thereby generating overload on the user agent.

Also, according to a conventional art, since a user agent registers information in respective real SIP servers by transmitting register messages, addresses of the entire respective real SIP servers should be recorded and kept. Since each of user agents should know network address of real SIP servers, broadcasting should be performed on networks, thereby more increasing loads on networks.

Also, according to a conventional art, since a user agent transmits registers message to respective real SIP servers and registers information, a difference of time that information is registered in the respective real SIP servers can grow larger, thereby increasing difference of time that information of the user agent is synchronized with the respective real SIP servers. Therefore, a method and an apparatus for solving the problems as described above is largely required

DISCLOSURE OF INVENTION

Technical Goals

The present invention is provided for solving the problems of conventional arts as described above and provides a method of providing register functions in a Session Initiation Protocol (SIP) load balancer and an SIP load balancer performing the method.

The present invention also provides a method of providing register functions in an SIP load balancer, in which the number of messages transceived by a user agent is decreased, thereby notably reducing the amount of information of real SIP servers to be recorded and maintained by a user agent, and an SIP load balancer performing the method.

The present invention also provides a method of providing register functions in an SIP load balancer, in which the amount of information of real SIP servers to be recorded and kept by a user agent is reduced, thereby preventing overloads, and an SIP load balancer performing the method.

The present invention also provides a method of providing register functions in an SIP load balancer, in which time used for register user agent information in at least one real SIP server, thereby reducing the time that the user agent information is synchronized with the respective SIP servers, and an SIP load balancer performing the method.

The present invention also provides a method of providing register functions in an SIP load balancer, in which register information of a user agent is recorded in order not to require synchronization of the register information between real SIP servers, thereby reducing wastes of human resources and material resources, and an SIP load balancer employing the method Technical Solutions According to an aspect of the present invention, there is provided is a method of performing register functions in an SIP load balancer, including the operations of: keeping an information table on which identifiers and network addresses of at least one real SIP server connected to a network; receiving a first register message from an user agent; copying the received first register message and transmitting the copied first register message to the at least one real SIP server recorded in the information table by referring to the information table; recording and keeping the identifiers of the at least one real SIP server to which the first register message is transmitted in connection with identification information of the user agent, wherein the identification information is one of a call ID of the user agent and an identifier of the user agent; receiving at least one response message in response to the first register message transmitted from the respective at least one real SIP server; reading the identification information and the identifiers of the real SIP server included in the response message and extracting an authentication character string included in the response message; recording the authentication character string in connection with the read identification information and the identifiers of the real SIP server in the information table; extracting header information with respect to authentication included in the at least one response message and generating an integration response message including the header information, wherein the header information includes an authentication character string; transmitting the integration response message to the user agent; receiving a first register response message in response to the integration response message from the user agent, wherein the first register response message includes an authentication response information in connection with the header information included in the integration response message; extracting the authentication response information included in the first register response message; reading identification information and the authentication character string included in the first register response message and searching identification information included in the first register response message by referring to the information table and a network address of the real SIP server in response to the authentication character string; transmitting a second response message including the extracted authentication response information to the retrieved network address of the real SIP server; receiving an acknowledgement message from the at least one real SIP server receiving the second register response message; and transmitting one of the received acknowledgement messages to the user agent.

According to another aspect of the present invention, there is provided an SIP load balancer including: an information table keeping identifiers of at least one real SIP server connected to a network, network addresses of the real SIP server, and identification information of an user agent, wherein the identification information is one of a call ID of the user agent or an identifier of the user agent; a message copying means for receiving a first register message from the user agent; copying the received first register message; referring to the information table and transmitting the first register message to the at least one real SIP server recorded in the information table; and recording the identifiers of the at least one real SIP server to which the first register message is transmitted in response to the identification information of the user agent; a real SIP server communication means connected to the at least one real SIP server for transmitting and receiving a predetermined message; a recording means for reading the identification information of the user agent and the identifier of the real SIP server included in a response message received from the at least one real SIP server; and extracting an authentication character string included in the response message and recording the authentication character string in the information table in response to the read identification information and the identifier of the real SIP server; a message processing means extracting header information with respect to authentication included in the response message and generating an integration response message including the header information; and extracting authentication response header information included in an integration register response message received from the user agent and generating a register response message including the authentication response header information when respective response messages are received from the at least one real SIP server recorded in the information table, an user agent communication means connected to the user agent for transmitting and receiving a predetermined message; and an information retrieval means for reading identification information and a authentication character string included in the register response message; and retrieving the identifier of the real SIP server in response to the identification information and the authentication character string by referring to the information table, wherein: the real SIP server communication means receives the response message from the real SIP server and transmits the register response message generated in the message processing means to the real SIP server; and the user agent communication means transmits the integration response message generated in the message processing portion to the user agent and receives the integration register response message from the user agent.

In the present invention, an SIP load is an apparatus performing balancing the loads of the SIP packet, and more particularly, is an apparatus which receives an SIP message, allocate a real SIP server to set a call up, and transmits the SIP message to the allocated server. Also, the SIP load balancer performs load-balancing functions in order to improve efficiency of network services based on IP and to extend ability of the real SIP servers.

Also, in the present invention, a register function provided by an SIP load balancer is a function which transmits and receives sequential packets and processes packets in order to register user agent information in at least one real SIP server by an SIP load balancer.

BEST MODE FOR CARRYING OUT THE INVENTION

Hereinafter, a method of providing register functions in an SIP load balancer and an SIP load balancer performing the method according to the present invention will now be described more fully with reference to the accompanying drawings.

Figure 5:
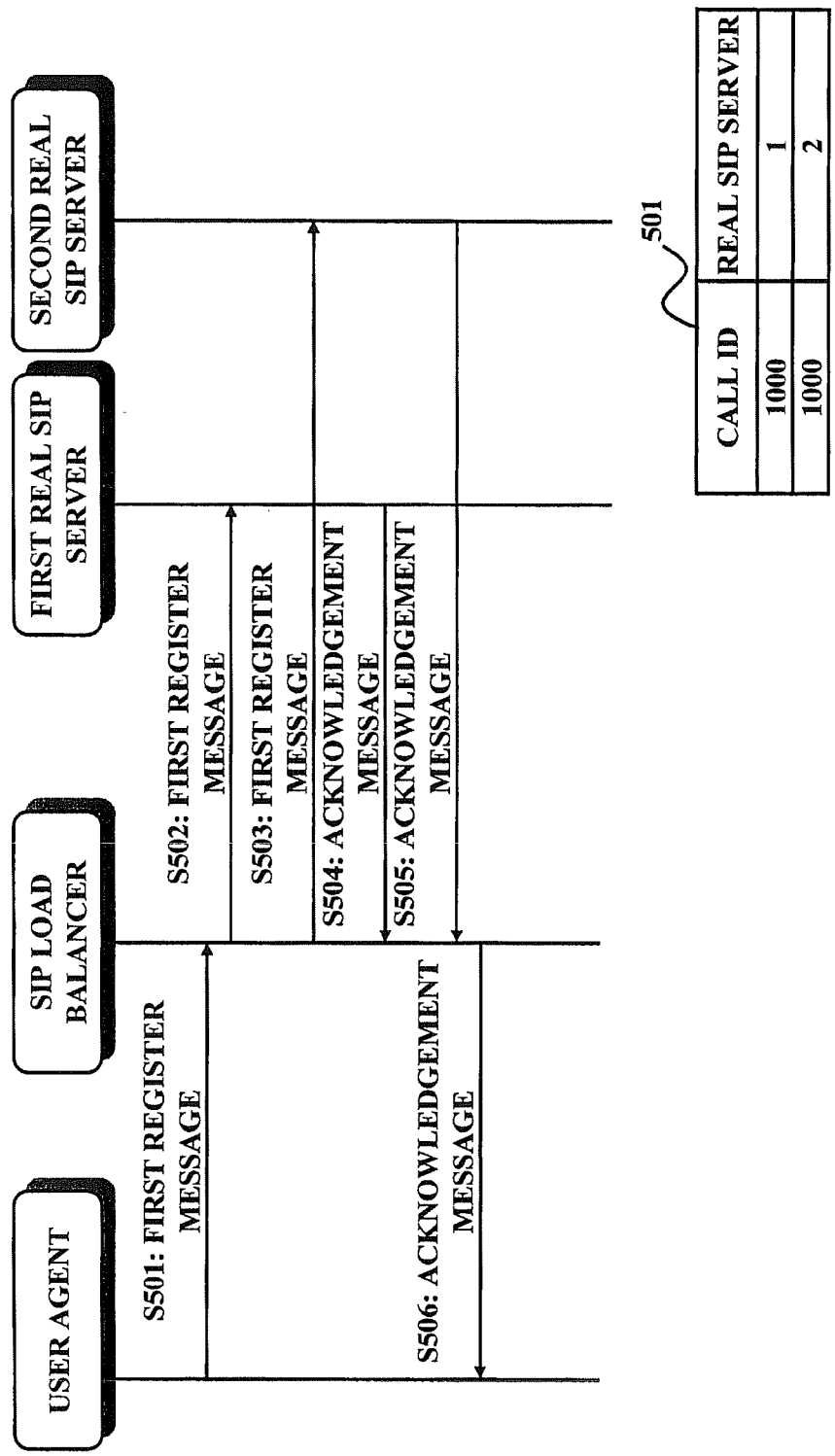
FIG. 5 is a diagram illustrating a process of registering user agent information in at least one real SIP server not requiring authentication, according to an embodiment of the present invention.

FIG. 5 is a diagram illustrating a process of registering user agent information in at least one real SIP server not requiring authentication, according to an embodiment of the present invention.

An SIP load balancer according to an embodiment of the present invention records and keeps an identifier and network address of at least one real SIP server connected to network in a predetermined information table.

Figure 1:
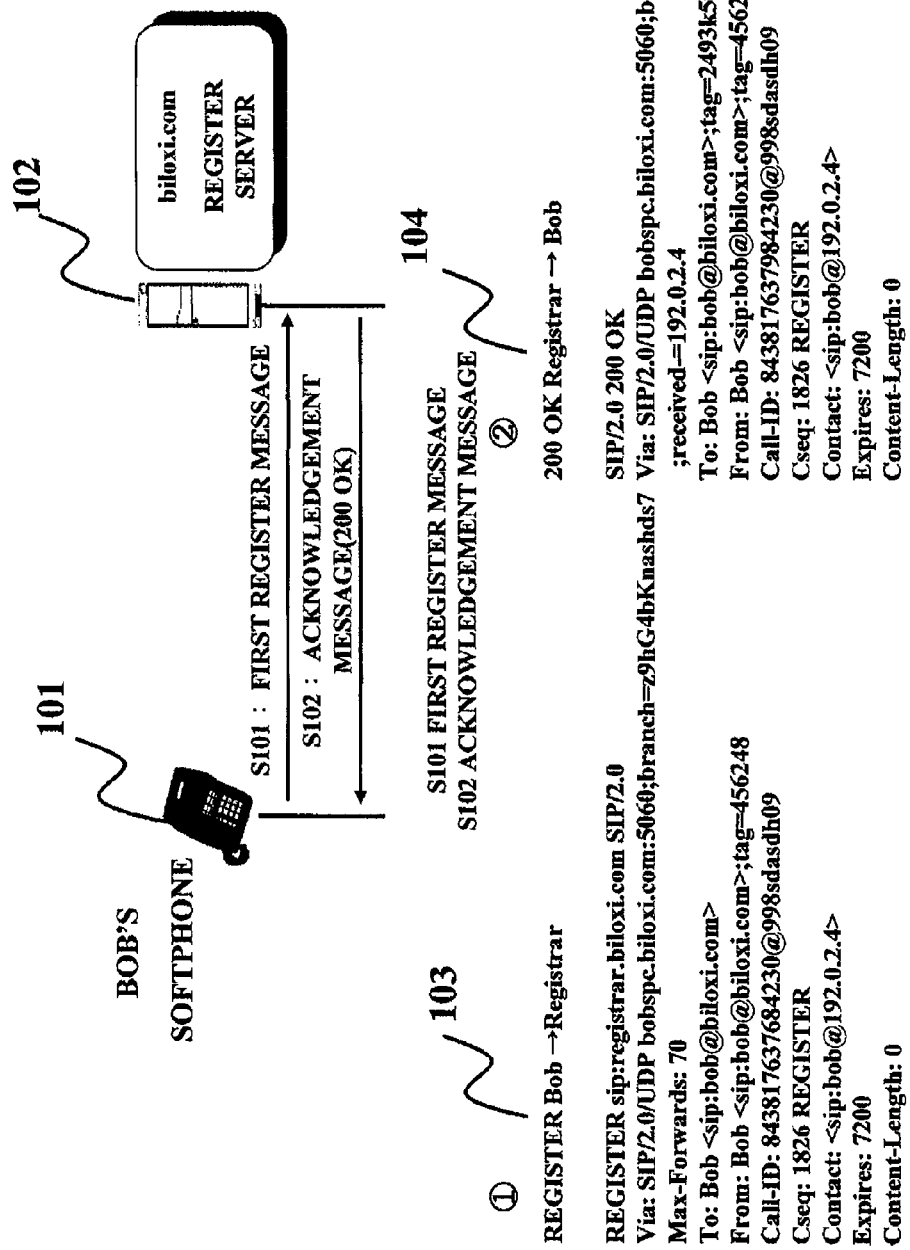
FIG. 1 is a diagram illustrating a general process of registering user agent information in a real Session Initiation Protocol (SIP) server not requiring authentication.
Figure 2:
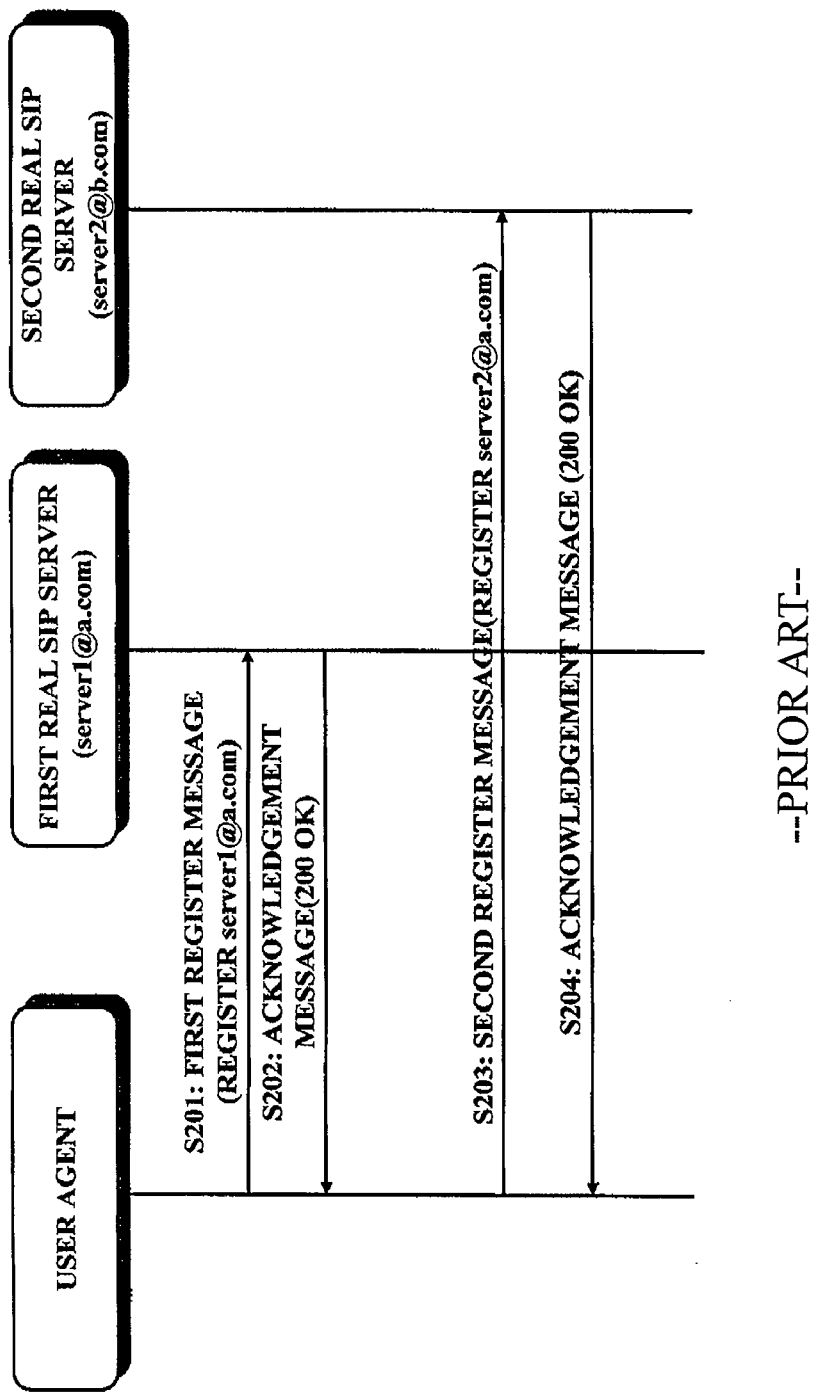
FIG. 2 is a diagram illustrating a general process of registering user agent information in at least one real SIP server not requiring authentication.

In operation 501, a user agent transmits a first register message to the SIP load balancer. The first register message can include the information described with reference to FIG. 1.

In operations 502 and 503, the SIP load balancer receives the first register message, copies the received first register message, refers to the information table, and transmits the copied first register message to at least one real SIP server recorded in the information table. For example, in case that the at least one SIP server recorded in the information table is a first real SIP server and second real SIP server, the SIP load balancer can copy the received first register message to transmit the copied first register message to the first and second real SIP servers.

Also, the SIP load balancer records identification information of the user agent and an identifier of the at least one real SIP server to which the first register message is transmitted in the information table. The identification information of the user agent can be one of a call ID or identifier of the user agent.

A reference numeral 501 indicates an example of the information table. Referring to the reference numeral 501, <1000> which is a call ID of the user agent and <1> and <2> which are identifiers of real SIP servers to which the first register message is transmitted are recorded in the information table.

In operations 504 and 505, each of the at least one real SIP server which receives the first register message transmits an acknowledgement message. The acknowledgement message can be the 200 OK message as described with reference to FIG. 1.

In operation 506, when the acknowledgement message is received from the real SIP servers to which the first register message is transmitted, the SIP load balancer transmits one of the received acknowledgement message to the user agent and drops the other messages transmitted from the real SIP servers.

According to the present invention, a register message is received from a user agent, copied to transmit at least one real SIP server, acknowledgement messages are received from the respective real SIP servers, and one of the acknowledgement messages is transmitted to the user agent, thereby providing register functions. Therefore, the user agent can register information of the user agent in at least one real SIP server by transmitting one first register message and receiving one acknowledgement message. Through the described above, the number of transmitted and received messages is decreased to reduce the amount of information processed by the user agent.

Also, in the present invention, an identifier and network address of at least one real SIP server connected to network are recorded in an information table to transmit a register message transmitted from a user agent to the real SIP server, thereby reducing the amount of information of the real SIP server processed by the respective user agents.

The effects described above become clear in accordance with increase of the number of real SIP servers in which information of a user agent is registered.

Figure 6:
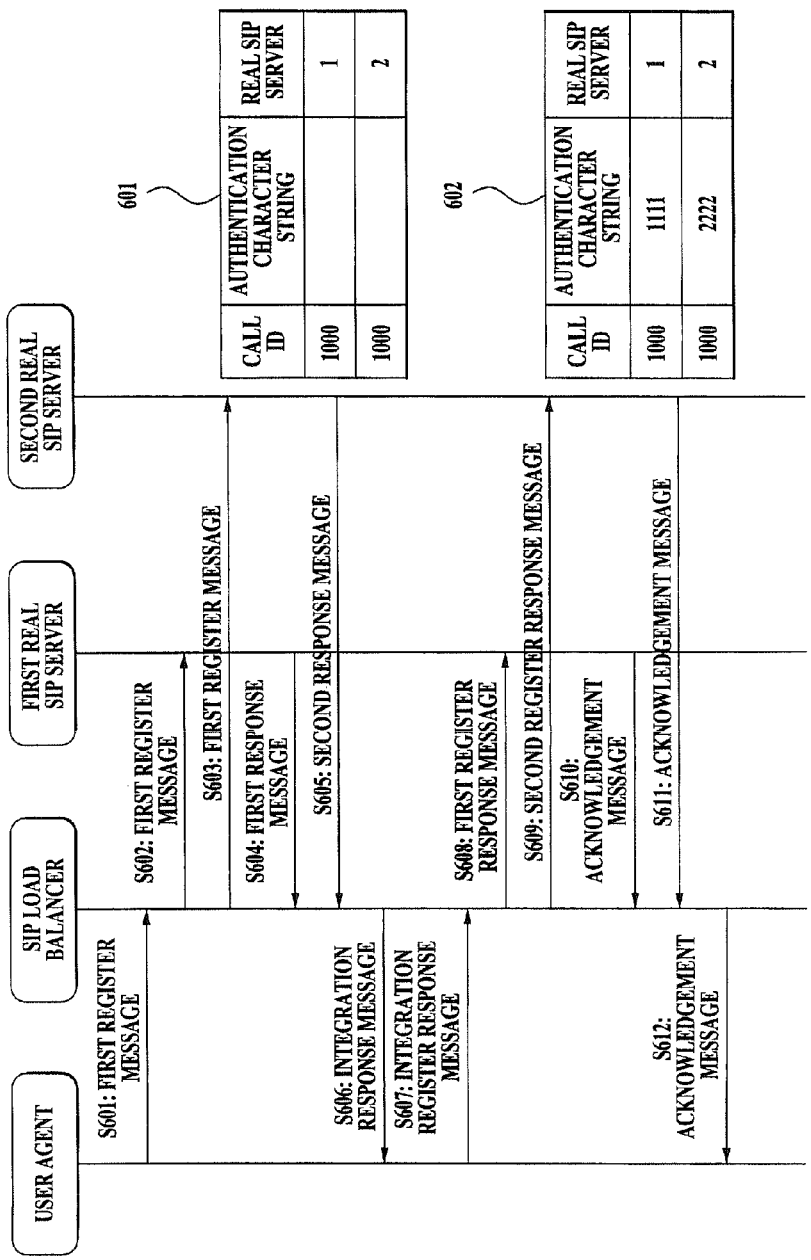
FIG. 6 is a diagram illustrating a process of registering user agent information in at least one real SIP server requiring authentication, according to an embodiment of the present invention.

FIG. 6 is a diagram illustrating a process of registering information of a user agent in a real SIP server requiring authentication, according to an embodiment of the present invention.

An SIP load balancer according to the present invention records an identifier and address of at least one real SIP server connected to network in a predetermined information table.

In operation 601, a user agent transmits a first register message to the SIP load balancer according to the present invention. The SIP load balancer according to the present invention receives and copies the first register message. In operations 602 and 603, the first register message is transmitted to the network address of the at least one real SIP server, which is recorded in the information table, and the identifier of the at least one real SIP server to which a message in response to identification information of the user agent is transmitted is recorded in the information table.

For example, in case that the real SIP servers recorded in the information table are a first real SIP server and a second real SIP server, the SIP load balancer copies a first register message and transmits the first register message to the first and second real SIP servers, respectively.

An example of the information table is indicated by a reference numeral 601. Referring to the reference numeral 601, identifiers <1> and <2> of real SIP servers to which a message is transmitted are recorded in association with a call ID <1000> of a user agent.

In operations of 604 and 605, the at least one real SIP server receives the first register message and transmits a response message in response to the first register message. In this case, when the at least one real SIP server performs authentication using HTTP authentication, the response message can include an authentication character string. Namely, the response message includes respectively WWW-Authenticate header, and the authentication character string can be a digest nonce value included in the WWW-Authenticate header. Information included in the response message was described with reference to FIG. 3.

In the example, the first and the second real SIP server can generate and transmit a first response message including <1111> and a second response message including <2222> as the authentication character strings to the SIP load balancer, respectively.

The SIP load balancer according to the present invention receives the response message, reads identification information of a user agent and an identifier of a real SIP server included in the response message, extracts an authentication character string included in the response message, and records the authentication character string in association with the read identification information and the real SIP server identifier in the information table.

In the example, the SIP load balancer reads the call ID <1000> and the first real SIP server identifier <1> included in the first response message, extracts the authentication character <1111> included in the first response message, and records the authentication character string <1111> in association with the read call ID <1000> and the first real SIP server identifier <1> in an information table indicated by a reference numeral 602. Also, the SIP load balancer reads the call ID <1000> and the second real SIP server identifier <2> included in the second response message, extracts the authentication character <2222> included in the second response message, and records the authentication character string <2222> in association with the read call ID <1000> and the second real SIP server identifier <2> in the information table indicated by the reference numeral 602.

When response messages of every the at least one real SIP server recorded in the information table are received, the SIP load balancer extracts header information with respect to authentication and generates an integration response message including the extracted header information. Also, the header information with respect to the authentication can include the authentication character string. In this case, the header information with respect to the authentication is the WWW-Authenticate header described with reference to FIG. 3, and the authentication character string can be the digest nonce value.

In the example, the SIP load balancer can extract the WWW-Authenticate headers included in the first and second response messages, respectively, and generate an integration including the WWW-Authenticate header. In this case, the WWW-Authenticate header of the first response message can include the digest nonce value <1111>, and the WWW-Authenticate header of the second response message can include the digest nonce value <2222>.

In operation 606, the SIP load balancer transmits the generated integration response message to the user agent.

The user agent receives the integration response message, generates authentication response header information in response to the respective header information with respect to the authentication included in the integration response message, and generates an integration register response message by integrating the header information with respect to the authentication.

In the example, the user agent generates an Authorization header, which is an authentication response header including a response value in response to the digest nonce, included in the respective WWW-Authenticate header and integrates the Authorization header to generate the integration register response message.

Namely, the Authorization header including a response value <aaaa> in response to the digest nonce value <1111> included in the integration response message and the Authorization header including a response value <bbbb> in response to the digest nonce value <2222> can be generated, and the integration register response message can be generated by integrating the two header. In this case, the Authorization header includes the digest nonce value and the response value.

In operation 607, the user agent transmits the integration register response message to the SIP load balancer.

The SIP load balancer receives the integration register response message, extracts the authentication response header information, and generates a register response message including the extracted authentication response header information.

In the example, the SIP load balancer can extract the Authorization header including the response value <aaaa> and the Authorization header including the response value <bbbb> and generate the register response messages including respectively the authorization headers.

In this case, the register response message including the response value <aaaa> is a first register response message, and the register response message including the response value <bbbb> is a second register response message.

Next, the SIP load balancer refers to the information table to search the identification information of the user agent and the identifier of the real SIP server in association with the authentication character string included in the register response message.

In operations 608 and 609, the SIP load balancer transmits the register response message to the network address in association with the retrieved real SIP server identifier by referring to the information table.

In this example, the SIP load balancer can searches the real SIP server identifier <1> in response to the call ID <1000> and the authentication character string <1111> included in the first register response message by referring to the information table of the reference numeral 602 and transmit the first register response message to the network address in association with the real SIP server identifier <1>.

Also, the SIP load balancer can searches the real SIP server identifier <2> in response to the call ID <2000> and the authentication character string <2222> included in the second register response message and transmit the second register response message to the network address in associated with the real SIP server identifier <2>.

In operations 610 and 611, the respective real SIP server which receives the register response message transmits an acknowledgement message to the SIP load balancer.

In operation 612, when the acknowledgement message is received from the every real SIP server to which the register response message is transmitted, the real SIP server transmits one of the acknowledgement messages to the user agent. The SIP load balancer drops rest of the acknowledgement messages.

According to the present invention, in a process of registering information of a user agent in at least one real SIP server requiring authentication of the user agent, an integration response message generated by integrating the response messages received from the real SIP servers is transmitted to the user agent, an integration register message generated by integrating register response messages in response to the integrating response message is received, and one of acknowledgement messages received from the at least one real SIP server is transmitted to the user agent, thereby reducing the number of messages transmitted and received from the user agent. Also, in the present invention, since at least one register response message can be transmitted together to the real SIP servers, amount of time that user agent information is registered in at least one real SIP server can be reduced to reduce amount of time that the user agent information is synchronized with the respective real SIP servers.

Also, in the information table of the present invention, since information such as identification information of a user agent, an authentication character string, identifiers of registered real SIP servers, etc., are recorded, it is not required to synchronize register information between real SIP servers, thereby reducing a waste of source.

Figure 7:
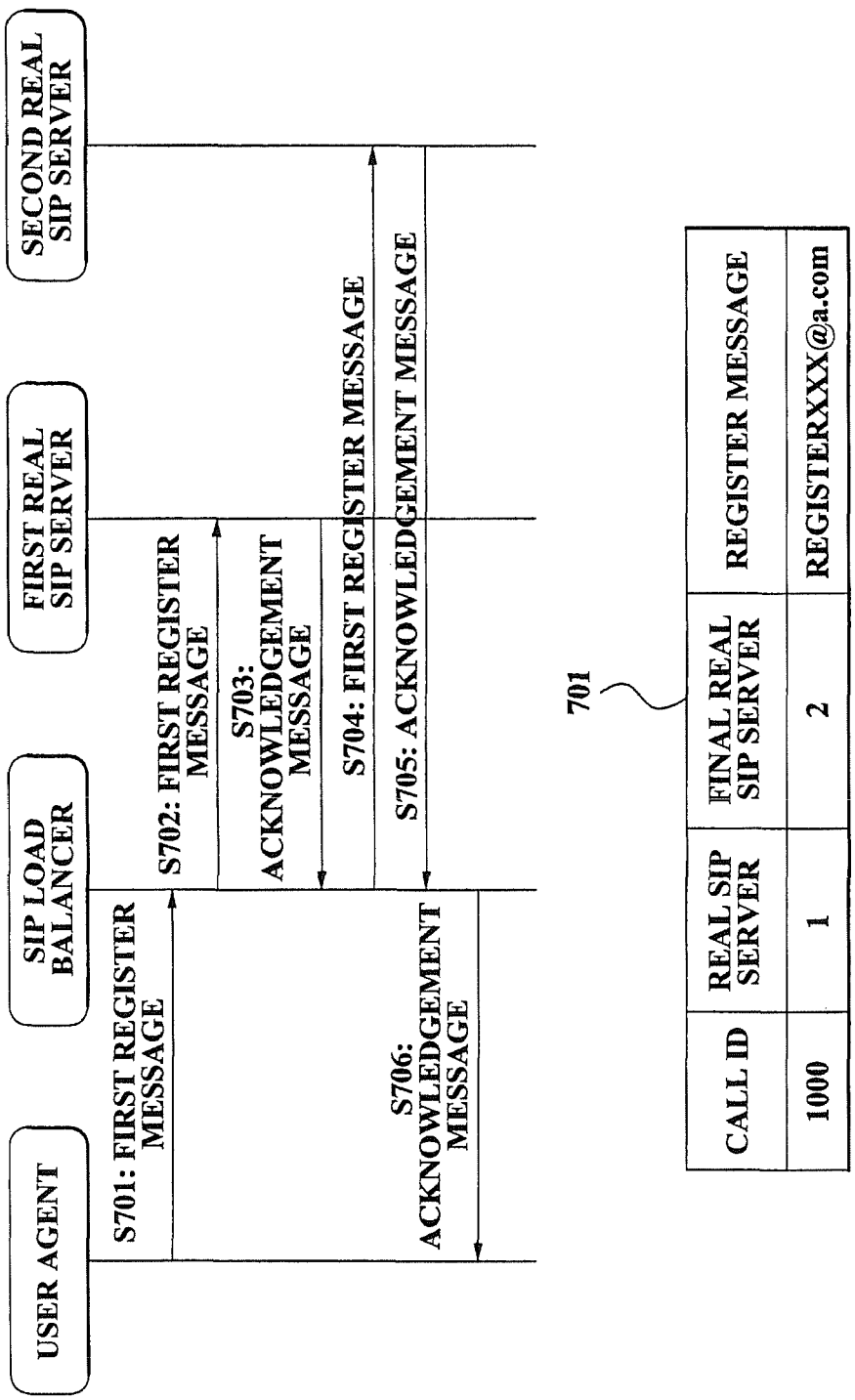
FIG. 7 is a diagram illustrating a process of registering user agent information in at least one real SIP server not requiring authentication, according to another embodiment of the present invention.

FIG. 7 is a diagram illustrating a process of registering information of a user agent in at least one real SIP server not requiring authentication, according to another embodiment of the present invention.

The SIP load balancer according to the present invention records an identifier and address of at least one real SIP server connected to network in a predetermined information table sequentially.

For example, the SIP load balancer can record the identifiers <1> and <2> of the real SIP servers connected to network and the network address in associated with the real SIP servers in the information table sequentially. In the example, a final entry of the real SIP server finally recorded is <2>.

In operation 701, the user agent transmits a first register message to the SIP load balancer of the present invention.

The SIP load balancer receives the first register message, refers to the information table, and allocates a first real SIP server to which the first register message is transmitted. Also, the SIP load balancer records identification information of the user agent, the identifier of the first real SIP server which is allocated, and the first register message in the information table. For example, the SIP load balancer can allocate the first real SIP server and record a call ID <1000>, the first real SIP server identifier <1>, the final SIP server identifier <2>, the first register message <REGISTER xxx@a.com> in the information table indicated by a reference numeral 701.

In operation 702, the SIP load balancer transmits the first register message to the allocated first real SIP server.

In operation 703, the first real SIP server receives the first register message and transmits an acknowledgement message to the SIP load balancer.

The SIP load balancer receives the acknowledgement message and determines whether the first real SIP server identifier is a final entry of the real SIP server identifier recorded in the information table by referring to the acknowledgement message.

In case that the first real SIP server identifier is the final entry, the SIP load balancer transmits the received acknowledgement message to the user agent and a register process is finished. Also, in case that the first real SIP sever identifier is not the final entry of the information table, the SIP load balancer allocates a second real SIP server recorded next to the first real SIP server by referring to the information table.

In operation 704, the SIP load balancer reads the first register message recorded in the information table and transmits the first register message to the allocated second real SIP server.

In the example, the SIP load balancer determines whether the first real SIP server identifier <1> is the final entry of the information table by referring to acknowledgement message. Referring to the reference numeral 701, since the second real SIP server identifier <2> is recorded as the final entry, the first real SIP server identifier <1> is not the final entry. Accordingly, the SIP load balancer allocates the second real SIP server <2> by referring to the information table and transmits the first register message <REGISTER xxx@a.com> recorded in the information table to the second real SIP server.

In operation 705, the second real SIP server receives the first register message and transmits an acknowledgement message to the SIP load balancer.

The SIP load balancer receives the acknowledgement message and determines whether the second real SIP server identifier is the final entry of the real SIP server identifier recorded in the information table by referring to the acknowledgement message.

In operation 706, in case that the second real SIP server identifier is determined as the final entry, the SIP load balancer transmits the acknowledgement message to the user agent.

In case that the second real SIP server identifier is determined as not the final entry, the SIP load balancer can allocate a third real SIP server recorded sequentially to the second real SIP server identifier by referring to the information table and transmit the first register message. The process described above can be performed repeatedly until an acknowledgement message is received from a real SIP server recorded as the final entry in the information table.

Accordingly, according to the present invention, when the user agent transmits the first register message to the SIP load balancer, the SIP load balancer reads the first register message and transmits the first register message to the at least one real SIP server connected to network to perform register functions until the acknowledgement message is received from the real SIP server recorded as the final entry in the information table, thereby reducing the number of messages transmitted and received from the user agent to notably reduce amount of information processed by the user agent. Also, since the SIP load balancer according to the present invention records and keeps the identifier and address of the at least one real SIP server in the information table to transmit the register message, amount of real SIP server information which has to be recorded and kept in the user agent can be reduced.

Figure 8:
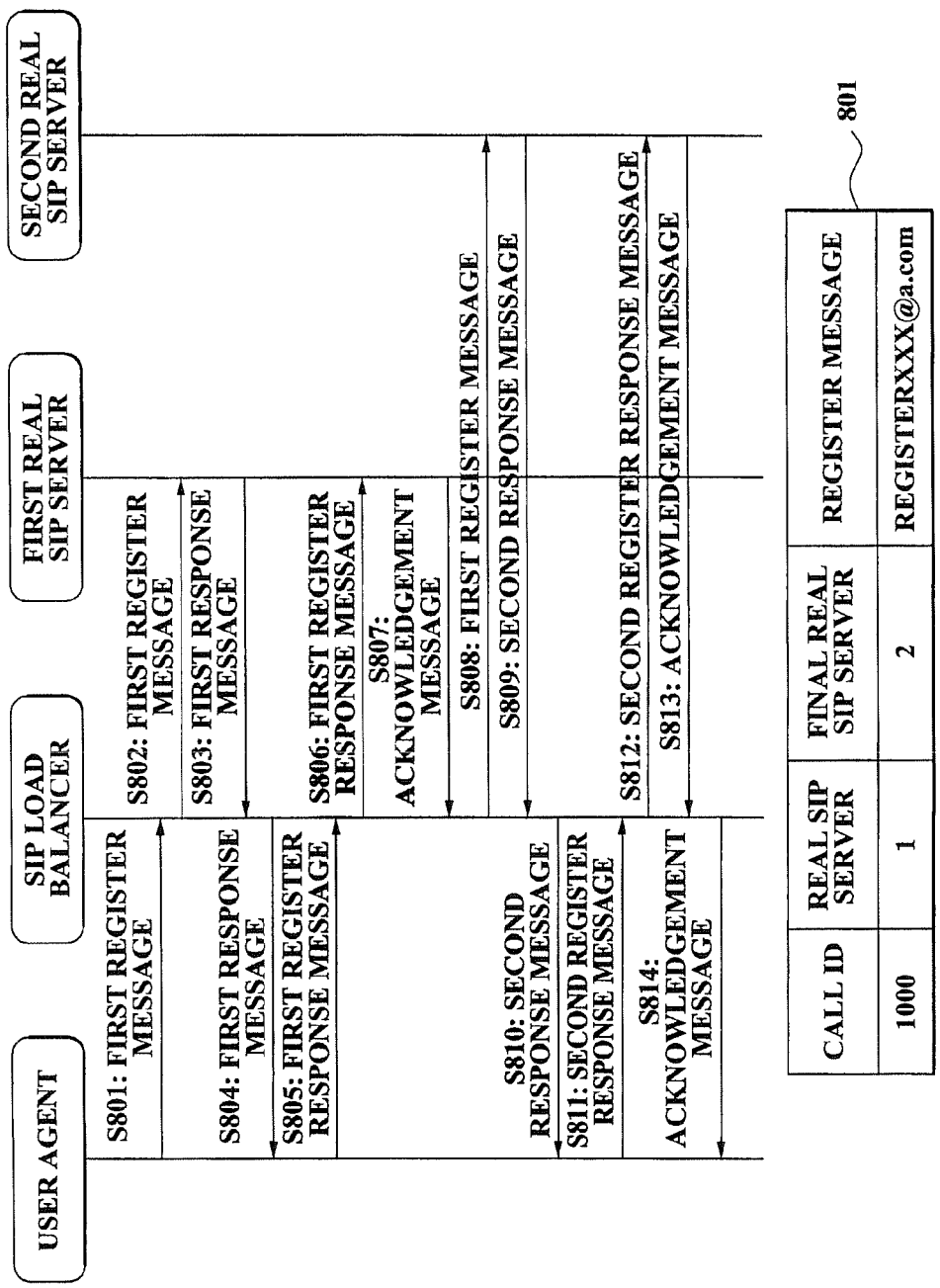
FIG. 8 is a diagram illustrating a process of registering user agent information in at least one real SIP server requiring authentication, according to another embodiment of the present invention.

FIG. 8 is a diagram illustrating a process of registering user agent information in at least one real SIP server requiring authentication, according to another embodiment of the present invention.

An SIP load balancer records and keeps an identifier and network address of at least one real SIP server connected to network in a predetermined information table sequentially.

In operation 801, a user agent transmits a first register message to the SIP load balancer.

The SIP load balancer receives the first register message, allocates a first real SIP server to which the first register message is registered by referring to the information table, and records identification information of the user agent, an identifier of the allocated first real SIP server, and the first register message in the information table.

A reference numeral 801 indicates an example of the information table, and a call ID <1000> of the user agent, the identifier <1> of the first real SIP server, an identifier <2> of a final real SIP server, and the first register message <REGISTER xxx@a.com> are recorded in the information table indicated by the reference numeral 801.

In operation 802, the SIP load balancer transmits the received first register message to the allocated first real SIP server.

In operations 803 through 807, the SIP load balancer transmits and receives messages with respect to authentication between the user agent and the first real SIP server.

The operations of transmitting and receiving the messages with respect to the authentication are as follows.

Figure 3:
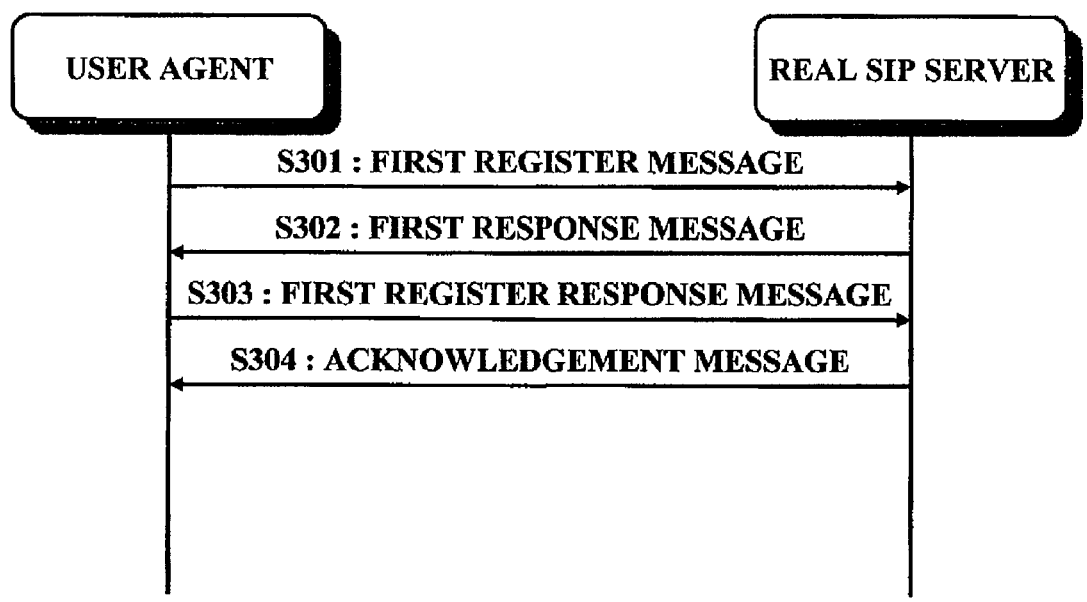
FIG. 3 is a diagram illustrating a general process of registering user agent information in a real SIP server requiring authentication.
Figure 4:
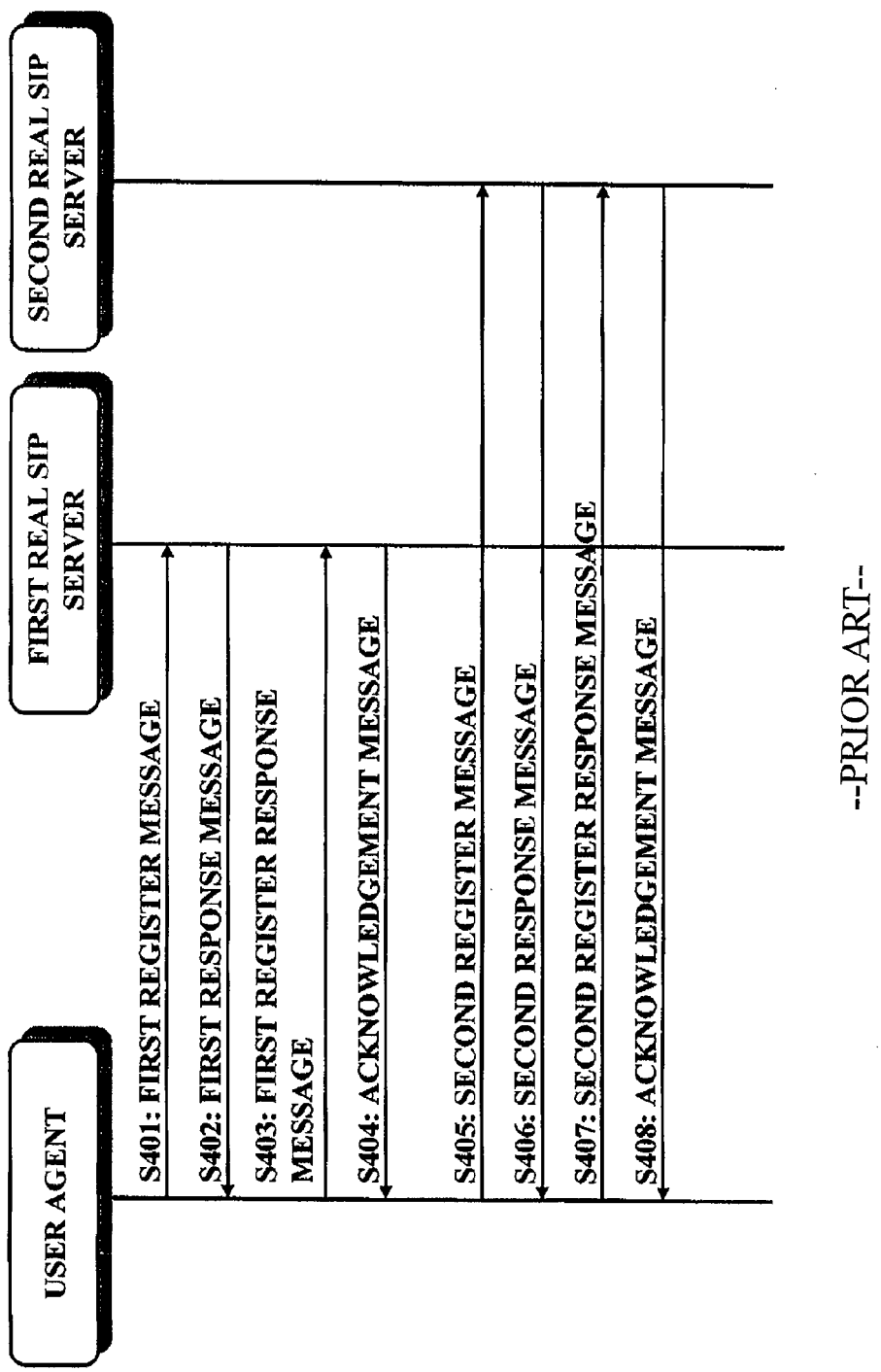
FIG. 4 is a diagram illustrating a general process of registering user agent information in at least one real SIP server requiring authentication.

In operation 803, the SIP load balancer receives a first response message from the allocated first real SIP server. The first response message includes header information with respect to authentication, and the WWW-Authenticate header including the digest nonce value, described referring to FIG. 3, is such the header information with respect to the authentication.

In operation 804, the SIP load balancer receives the first response message and transmits the first response message to the user agent.

In operation 805, the user agent receives the first response message, generates a first register response message in response to the first response message, and transmits the first register response message to the SIP load balancer. In this case, the first register response message includes authentication response header information in response to the header information with respect to the authentication. As described above, the authentication response header information can be an Authorization header which is an authentication response header information including a response value in response to the digest nonce value included in the WWW-Authenticate header.

In operation 806, the SIP load balancer transmits the received first register message to the first real SIP server.

In operation 807, the first real SIP server generates an acknowledgement message in response to the received first register message and transmits the acknowledgement message to the SIP load balancer.

The SIP load balancer receives the acknowledgement message and determines whether the first real SIP server identifier is the final entry of the real SIP server identifiers recorded in the information table by referring to the acknowledgement message.

In case that the first real Sip server identifier is the final entry of the real SIP server identifiers recorded in the information table, the SIP load balancer transmits the received acknowledgement message to the user agent and a register process is finished.

In operation 808, in case that the first real Sip server identifier is not the final entry of the real SIP server identifiers recorded in the information table, the SIP load balancer allocates a second real SIP server recorded next to the first real SIP server by referring to the information table, reads the first register message stored in the information table by referring to the information table, and transmits the read first register message to the second real SIP server.

In the example, the SIP load balancer receives the acknowledgement message and determines whether the first SIP server identifier <1> is the final real SIP server identifier <2> recorded in the information table indicated by the reference numeral 801.

Since the first real SIP server identifier is not the final entry recorded in the information table, the SIP load balancer allocates the second real SIP server, reads the first register message <REGISTER xxx@a.com> stored in the information table, and transmits the register message <REGISTER xxx@a.com> to the allocated second real SIP server.

In operations 809 through 812, the SIP load balancer transmits and receives messages with respect to authentication between the user agent and the second real SIP server. A process of transmitting and receiving the messages with respect to the authentication is as following.

In operation 809, the second real SIP server receives the first register message, generates a second response message, and transmits the second response message to the SIP load balancer. In this case, the second response includes header information with respect to authentication.

In operation 810, the SIP load balancer receives the second response message, puts a reauthentication parameter into the header information with respect to the authentication included in the received second response message to transmit to the user agent. In this case, the header information with respect to the authentication can be a WWW-Authenticate header, and the reauthentication parameter can be a stale parameter which is a stale parameter (STALE="TRUE") set as a true value.

Accordingly, in the present invention, the second response message including the reauthentication parameter is transmitted to the user agent, thereby informing the user agent that the second response message is not a message transmitted as a result of a failure of authentication from the first real SIP server in response to the first register response message transmitted from the user agent in operation 805. Since the acknowledgement message received from the real SIP server is not transmitted to the user agent in operation 807, which is different from conventional arts, the user agent may recognize the second response message as the message transmitted as the result of the failure of the authentication from the first real SIP server in response to the first register response message transmitted from the user agent in operation 805. Accordingly, the SIP load balancer puts the reauthentication parameter into the second response message in order to inform the user agent that the second response message is not the message retransmitted as the result of the failure of the authentication but a response message which is normally transmitted.

In operation 811, the user agent receives the second response message including the reauthentication parameter, identifies the same, generates a second register response message in response to the second response message instead of the register message in response to the first response message received in operation 804, and transmits the second register response message to the SIP load balancer. The second register response message includes authentication response header information in associated with the header information with respect to the authentication included in the second response message. As described above, the authentication response header information can include the response value by hashing the nonce value included in the header information with respect to the authentication.

In operation 812, the SIP load balancer transmits the received second register response message to the second real SIP server. In operation 813, the second real SIP server receives the second register response message, generates an acknowledgement message in response to the second register response message, and transmits the acknowledgement message to the SIP load balancer.

The SIP load balancer receives the acknowledgement message and determines whether the second real SIP server identifier is the final entry by referring to the information table.

In operation 814, in case that the second real SIP server identifier is the final entry, the SIP load balancer transmits the received acknowledgement message to the user agent and the register process is finished. In the example, the SIP load balancer receives the acknowledgement message, determines whether the second real SIP server identifier <2> is the final real SIP server identifier <2> recorded in the information table of the reference numeral 801, and transmits the acknowledgement message to the user agent.

Also, in case that the second real SIP server identifier is not the final entry, the SIP load balancer allocates a real SIP server recorded next to the second real SIP server by referring to the information table and performs the described register process. The process is performed repeatedly until the acknowledgement message is received from a real SIP server recorded as the final entry in the information table.

Accordingly, in the present invention, when a first register message is received from a user agent, the first register message is recorded in a information table to transmit to at least one real SIP server, the authentication process is performed to register user agent information in every the at least one real SIP server, also, only an acknowledgement message received from a final real SIP server is transmitted to the user agent, thereby reducing the number of messages transmitted and received from the user agent to notably reduce amount of information processed by the user agent.

The method of performing register functions in the SIP load balancer according to the present invention can be realized as program codes executed via various computer means and recorded in computer readable recording media. The computer readable recording media may include program codes, data files, data structure, etc, separately or in combination. The program codes recorded in the media are particularly designed and formed but may be used by those skilled in the art of computer software. Examples of the computer readable recording media include magnetic media such as hard disks, floppy disks, and magnetic tapes, optical media such as CD-ROMs and DVDs, magneto-optical media such as floptical disks, and hardware devices such as ROMs, RAMs, and flash memories, which are particularly formed in order to store and perform the program codes. The media may be transmission media such as optical or metal wire, and wave guides including carrier waves for transmitting signals designating the program codes, data structures, etc. Examples of the program codes include not only machine codes made by compilers but also high-level language which can be executed by computers by using interpreters. The hardware devices may be formed to operate as at least one software modules for performing the operations of the present invention, and the inverse is the same.

Figure 9:
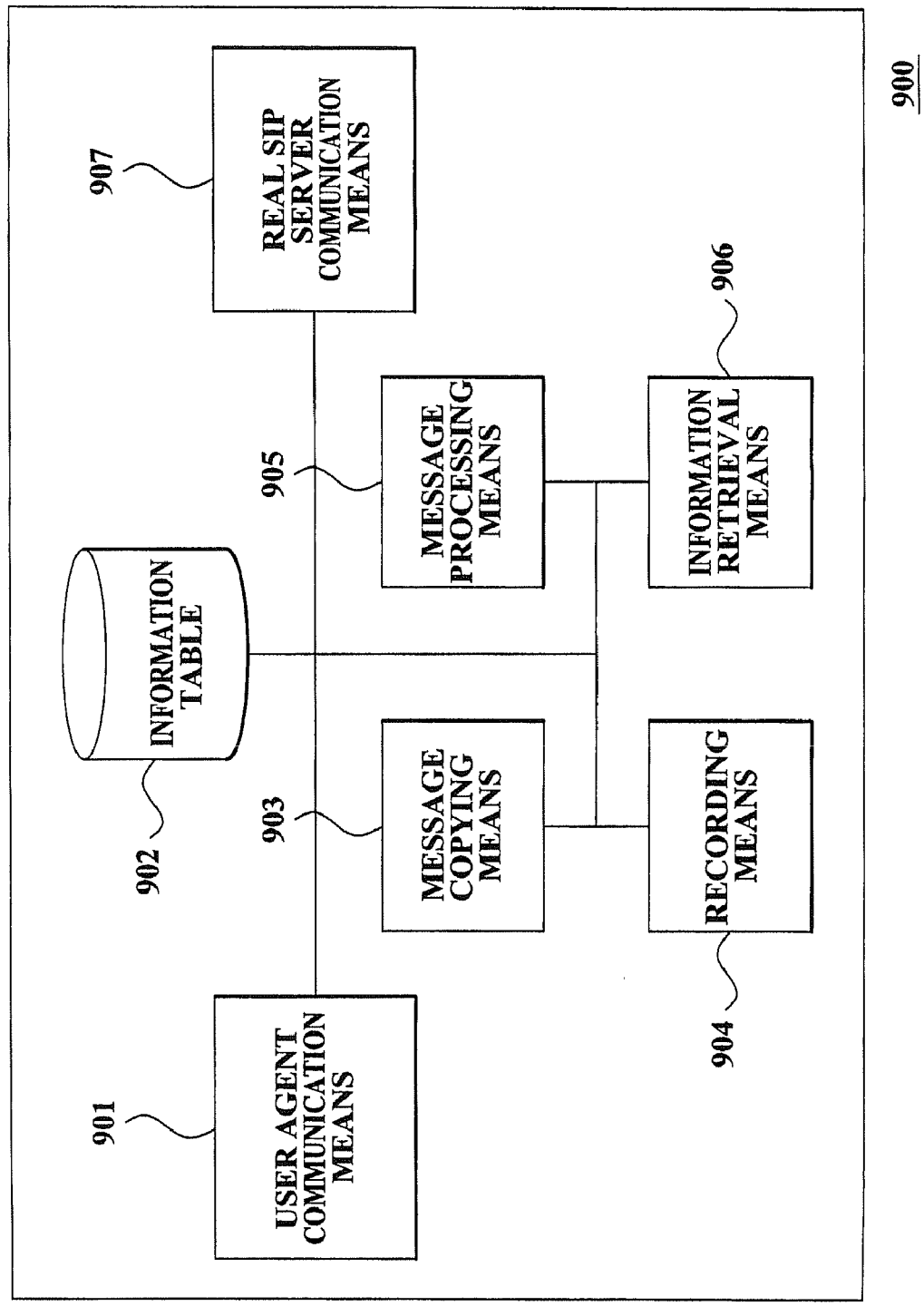
FIG. 9 is a diagram illustrating a configuration of an apparatus providing register functions in an SIP load balancer, according to an embodiment of the present invention.

FIG. 9 is a block diagram illustrating a configuration of an apparatus for providing register functions in the SIP load balancer according to an embodiment of the present invention.

Referring to FIG. 9, the apparatus 900 providing the register functions in the SIP load balancer according to the present invention can be formed including a user agent communication means 901, an information table 902, a message copying means 903, a recording means 904, a message processing means 905, an information retrieval means 906, and a real SIP server communication means 907.

The information table 902 keeps an identifier of at least one real SIP server connected to network, a network address of the real SIP server, and identification information of a user agent. As described above, the identification information of the user agent can be a call ID or identifier of the user agent.

The message copying means receives a first register message from the user agent, copies the received first register message, transmits the first register message to the at least one real SIP server recorded in the information table 902 by referring to the information table 902, and records the identifier of the at least one real SIP server to which the first register message is transmitted in connection with the identification information of the user agent.

The copying means 904 reads the identification information of the user agent and the real SIP server identifier included in a response message received from the at least one real SIP server, extracts a authentication character string included in the response message, and records the authentication character string in connection with the read identification information and the real SIP server identifier in the information table 902.

When each of the response messages is received from the at least one real SIP server recorded in the information table 902, the message processing means 905 extracts header information with respect to authentication, generates an integration response message including the header information, extracts authentication response header information included in an integration register response message received from the user agent, and generates a register response message including the authentication response header information.

The information retrieval means 906 reads the identification information and the authentication character string included in the register response message and retrieves the real SIP server identifier in connection with the identification information and the authentication character string.

The real SIP server communication means 907 is a sort of an interface module connected to the at least one real SIP server to transmit and receive predetermined messages.

The user agent communication means 901 is a sort of an interface module connected to the user agent to transmit and receive predetermined messages.

As described above, the real SIP server communication means 907 receives the response message from the real SIP server and transmits the register response message generated by the message processing means 905 to the real SIP server, and the user agent communication means 901 transmits the integration response message generated by the message processing means 905 to the user agent and receives the integration register response message from the user agent.

Since the operations of the SIP load balancer according to an embodiment of the present invention shown in FIG. 9 are described in detail in the description on FIGS. 5 and 6, description in detail will be omitted.

Figure 10:
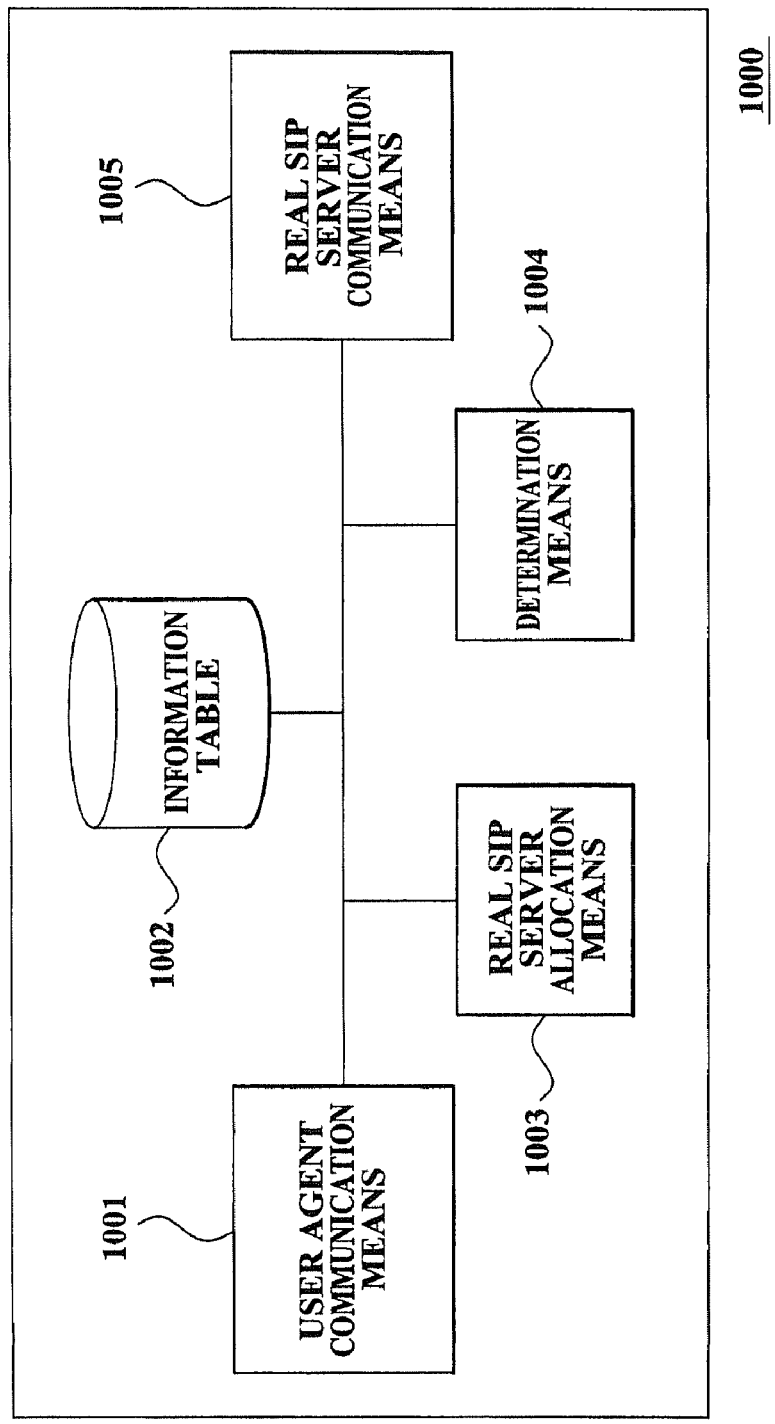
FIG. 10 is a diagram illustrating a configuration of an apparatus providing register functions in an SIP load balancer, according to another embodiment of the present invention.

FIG. 10 is a block diagram illustrating a configuration of an apparatus for providing register functions in the SIP load balancer according to another embodiment of the present invention.

Referring to FIG. 10, the apparatus providing the register functions in the SIP load balancer according to another embodiment of the present invention is formed including a user agent communication means 1001, an information table 1002, a real SIP server allocation means 1003, a determination means 1004, and a real SIP server communication means 1005.

The information table 1002 keeps an identifier of at least one real SIP server connected to network, a network address of the real SIP server, and identification information of a user agent. The identification information of the user agent can be a call ID or identifier of the user agent.

The real SIP server allocation means 1003 allocates the real SIP server to which a register message received from the user agent by referring to the information table 1002 and records the identification information of the user agent, the real SIP server identifier, and the register message in the information table 1002.

The determination means 1004 receives an acknowledgement message from the at least one real SIP server and determines whether the real SIP server identifier is a final entry of the real SIP server identifiers recorded in the information table 1002 by referring to the received acknowledgement message.

The user agent communication means 1001 is an interface module which transmits the acknowledgement message received from the real SIP server to the user agent and receives the register message or a register response message from the user agent. As described above, the response message includes header information with respect to authentication, and the register response message includes authentication response header information in response to the header information.

The real SIP server communication means 1005 is an interface module which transmits the received first register response message to the real SIP server and receives the acknowledgement message from the real SIP server.

In case that the real SIP server is not the final entry recorded in the information table 1002, the determination means allocates a second real SIP server by referring to the information table, reads the register message recorded in the information table, controls the real SIP server communication means to transmit the register message to the second real SIP sever; puts a re-authentication parameter into header information with respect to authentication included in a second response message received from the second real SIP server, controls the user agent communication means to transmit the header information to the user agent, controls the real SIP server communication means to receive a second register response message from the user agent, and controls the real SIP server communication means to transmit the second register message to the second real SIP server.

Since the detailed operations of the SIP load balancer according to another embodiment of the present invention shown in FIG. 10 is described in detail in the description on FIGS. 7 and 8, detailed description will be omitted.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

According to the present invention, there is provided a method for providing register functions in an SIP load balancer and an SIP load balancer performing the method.

According to the present invention, there is provided a method of providing register functions in an SIP load balancer, in which the number of messages tranceived by a user agent is decreased, thereby notably reducing the amount of information of real SIP servers to be recorded and maintained by a user agent, and an SIP load balancer performing the method.

According to the present invention, there is provided a method of providing register functions in an SIP load balancer, in which the amount of information of real SIP servers to be recorded and kept by a user agent is reduced, thereby preventing overloads, and an SIP load balancer performing the method.

According to the present invention, there is provided a method of providing register functions in an SIP load balancer, in which time used for register user agent information in at least one real SIP server, thereby reducing the time that the user agent information is synchronized with the respective SIP servers, and an SIP load balancer performing the method.

According to the present invention, there is provided a method of providing register functions in an SIP load balancer, in which register information of a user agent is recorded in order not to require synchronization of the register information between real SIP servers, thereby reducing wastes of human resources and material resources, and an SIP load balancer performing the method.

The invention claimed is:

1. A method of performing register functions in an SIP load balancer, comprising the operations of: keeping an information table on which identifiers and network addresses of at least one real SIP server connected to a network; receiving a first register message from an user agent; copying the received first register message and transmitting the copied first register message to the at least one real SIP server recorded in the information table by referring to the information table; recording and keeping the identifiers of the at least one real SIP server to which the first register message is transmitted in connection with identification information of the user agent, wherein the identification information is one of a call ID of the user agent and an identifier of the user agent; receiving at least one response message in response to the first register message transmitted from the respective at least one real SIP server; reading the identification information and the identifiers of the real SIP server included in the response message and extracting an authentication character string included in the response message; recording the authentication character string in connection with the read identification information and the identifiers of the real SIP server in the information table; extracting header information with respect to authentication included in the at least one response message and generating an integration response message including the header information, wherein the header information includes an authentication character string; transmitting the integration response message to the user agent; receiving a first register response message in response to the integration response message from the user agent, wherein the first register response message includes an authentication response information in connection with the header information included in the integration response message; extracting the authentication response information included in the first register response message; reading identification information and the authentication character string included in the first register response message and searching identification information included in the first register response message by referring to the information table and a network address of the real SIP server in response to the authentication character string; transmitting a second response message including the extracted authentication response information to the retrieved network address of the real SIP server; receiving an acknowledgement message from the at least one real SIP server receiving the second register response message; and transmitting one of the received acknowledgement messages to the user agent.

2. The method of claim 1, wherein: the header information included in the response message is a WWW-AUTHENTICATE header; and the authentication character string is a NONCE value.

3. A method of performing register functions in an SIP load balancer, comprising the operations of:
keeping an information table on which identifiers and network addresses of at least one real SIP server connected to a network;
receiving a first register message from an user agent;
allocating a first real SIP server to which the first register message is transmitted by referring to the information table, and recording identification information of the user agent, the identifier of the allocated first real SIP server, and the first register message in the information table, wherein the identification information is one of a call ID of the user agent and an identifier of the user agent; transmitting the first register message to the first real SIP server;
receiving an acknowledgement message from the first real SIP server;
determining whether the identifier of the first real SIP server included in the acknowledgement message is a final entry of the identifiers of at least one real SIP server recorded in the information table;
transmitting the received acknowledgement message to the user agent when the identifier of the first real SIP server is the final entry; and
in case that the identifier of the first real SIP server is not the final entry recorded in the information table, referring to the information table, allocating a second real SIP server, reading and transmitting the first register message recorded in the information table to the second real SIP server;
receiving an acknowledge message from the second real SIP server; and
determining whether the identifier of the second real SIP server included in the acknowledgement message is the final entry of the identifiers of at least one real SIP server recorded in the information table.

4. A method of performing register functions in an SIP load balancer, comprising the operations of: keeping an information table on which identifiers and network addresses of at least one real SIP server connected to a network; receiving a first register message from an user agent; allocating a first real SIP server to which the first register message is transmitted by referring to the information table, and recording identification information of the user agent, the identifier of the allocated first real SIP server, and the first register message in the information table, wherein the identification information is one of a call ID of the user agent and an identifier of the user agent; transmitting the first register message to the first real SIP server; receiving a first response message from the first real SIP server, wherein the first response message includes header information with respect to authentication; transmitting the received first response message to the user agent; receiving a first register response message from the user agent, wherein the first register response message includes authentication response header information in response to the header information with respect to the authentication included in the first response message; transmitting the received first register response message to the first real SIP server; receiving an acknowledgement message from the first real SIP server; determining whether the identifier of the first real SIP server included in the acknowledgement message is a final entry of the identifiers of at least one real SIP server recorded in the information table; and transmitting the received acknowledgement message to the user agent when the identifier of the first real SIP server is the final entry.

5. The method of claim 4, further comprising the operations of: in case that the identifier of the first real SIP server is not the final entry recorded in the information table, allocating a second real SIP server by referring to the information table, reading and transmitting the first register message recorded in the information table to the second real SIP server; receiving a second response message from the second real SIP server, wherein the second response message includes header information with respect to authentication; transmitting the received second response message to the user agent; receiving a second register response message from the user agent, wherein the second register response message includes authentication response header information in response to the header information with respect to the authentication included in the second response message; transmitting the received second register response message to the second real SIP server; and receiving an acknowledgement message from the second real SIP server.

6. The method of claim 5, wherein the operation of transmitting the received second response message to the user agent comprises the operations of: putting a re-authentication parameter into the header information with respect to the authentication included in the second response message; transmitting the second response message including the re-authentication parameter to the user agent; receiving a second register response message from the user agent, wherein the second register response message includes header information with respect to authentication response in response to the header information with respect to the authentication included in the second response message; and transmitting the second register response message to the second real SIP server.

7. The method of claim 6, wherein: the header information included in the response message is a WWW-AUTHENTICATE header; the authentication character string is a NONCE value; and the re-authentication parameter is a stale parameter and is set as TRUE.

8. A non-transitory computer readable recording medium on which a program for executing the method of any one of claims 1, 2 and 3-7 at computers is recorded.

9. An SIP load balancer comprising: an information table keeping identifiers of at least one real SIP server connected to a network, network addresses of the real SIP server, and identification information of an user agent, wherein the identification information is one of a call ID of the user agent or an identifier of the user agent; a message copying means for receiving a first register message from the user agent; copying the received first register message; referring to the information table and transmitting the first register message to the at least one real SIP server recorded in the information table; and recording the identifiers of the at least one real SIP server to which the first register message is transmitted in response to the identification information of the user agent; a real SIP server communication means connected to the at least one real SIP server for transmitting and receiving a predetermined message; a recording means for reading the identification information of the user agent and the identifier of the real SIP server included in a response message received from the at least one real SIP server; and extracting an authentication character string included in the response message and recording the authentication character string in the information table in response to the read identification information and the identifier of the real SIP server; a message processing means extracting header information with respect to authentication included in the response message and generating an integration response message including the header information; and extracting authentication response header information included in an integration register response message received from the user agent and generating a register response message including the authentication response header information when respective response messages are received from the at least one real SIP server recorded in the information table; an user agent communication means connected to the user agent for transmitting and receiving a predetermined message; and an information retrieval means for reading identification information and a authentication character string included in the register response message; and retrieving the identifier of the real SIP server in response to the identification information and the authentication character string by referring to the information table, wherein: the real SIP server communication means receives the response message from the real SIP server and transmits the register response message generated in the message processing means to the real SIP server; and the user agent communication means transmits the integration response message generated in the message processing portion to the user agent and receives the integration register response message from the user agent.

10. An SIP load balancer comprising: an information table keeping identifiers of at least one real SIP server connected to a network, network addresses of the real SIP server, and identification information of an user agent, wherein the identification information is one of a call ID of the user agent or an identifier of the user agent; a real SIP server allocation means for allocating a real SIP server to which a register message received from the user message is transmitted by referring to the information table and recording identification information of the user agent, an identifier of the real SIP server, and the register message in the information table; a determination means for receiving acknowledgement messages from the at least one real SIP server; and determining whether the identifier of the real SIP server is a final entry of the identifiers of the real SIP servers recorded in the information table according to the received acknowledgement message; an user agent communication means for transmitting a response message received from the real SIP server to the user agent, and receiving one of the register message and a register response message from the user agent, wherein the response message includes header information with respect to authentication, and the register response message includes authentication response header information in response to the header information; and a real SIP server communication means for transmitting the received register response message to the real SIP server; and receiving an acknowledgement message from the real SIP server, wherein: the determination means allocates a second real SIP server by referring to the information table in case that the identifier of the real SIP server is not the final entry recorded in the information table, reads the register message recorded in the information table, controls the real SIP server communication means to transmit the register message to the second real SIP sever; puts a re-authentication parameter into header information with respect to authentication included in a second response message received from the second real SIP server, controls the user agent communication means to transmit the header information to the user agent, controls the real SIP server communication means to receive a second register response message from the user agent, and controls the real SIP server communication means to transmit the second register message to the second real SIP server.

* * * * *